(12) United States Patent
Hirshberg

(10) Patent No.: US 6,901,620 B1
(45) Date of Patent: Jun. 7, 2005

(54) LANDSCAPING SHEARS WITH BRANCH TOOL FOR RETRIEVING BRANCHES AND LIMBS

(76) Inventor: Phillip Hirshberg, 301 E. Mariposa, Phoenix, AZ (US) 85012

( * ) Notice: Subject to any disclaimer, the term of this patent is extended or adjusted under 35 U.S.C. 154(b) by 0 days.

(21) Appl. No.: 10/658,554

(22) Filed: Sep. 8, 2003

(51) Int. Cl.$^7$ ............................................. B28I 11/00
(52) U.S. Cl. .......................................... 7/159; 30/131
(58) Field of Search ............... 30/131, 146; 7/158–159

(56) References Cited

U.S. PATENT DOCUMENTS

| | | | |
|---|---|---|---|
| 92,100 A | * | 6/1869 | Richard ........................ 30/146 |
| 99,038 A | * | 1/1870 | Walsh et al. ................... 30/146 |
| D305,494 S | | 1/1990 | Jasperson |
| 4,985,954 A | * | 1/1991 | Wehr .............................. 7/144 |
| D347,771 S | | 6/1994 | Lutzke |
| 5,634,276 A | | 6/1997 | Lin |

* cited by examiner

Primary Examiner—Dougls D Watts
(74) Attorney, Agent, or Firm—Gregory J. Nelson

(57) ABSTRACT

A branch hook attachment for tools such as loping shears or hedge trimmers to provide the user extended reach to grasp foliage so the foliage can be pulled within the user's reach. The hook is U-shaped and defines a bight area into which the branch or limb can be guided and grasped for cutting. The hook can be provided as an after-market item which can be secured to the handle of existing tools by a clamp or may be incorporated at the end of one of the handles. The hook may also be removably insertable into the hollow end of one of the handles and retained by a detent. In another embodiment, the branch hook is a flexible material and is attached to the end of the tool handle so the branch hook can be better guided to access and extricate branches through entangled foliage.

12 Claims, 2 Drawing Sheets

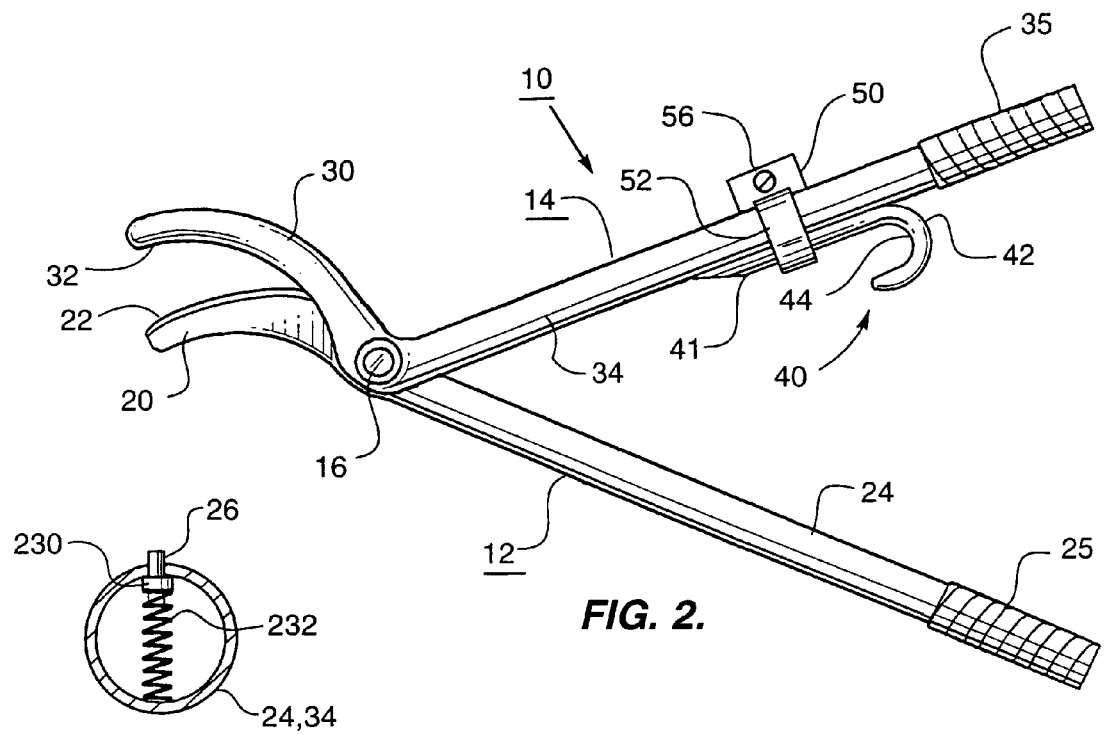
FIG. 2.
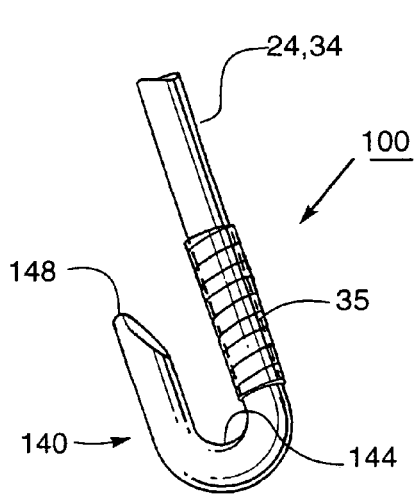
FIG. 3A.
FIG. 1.
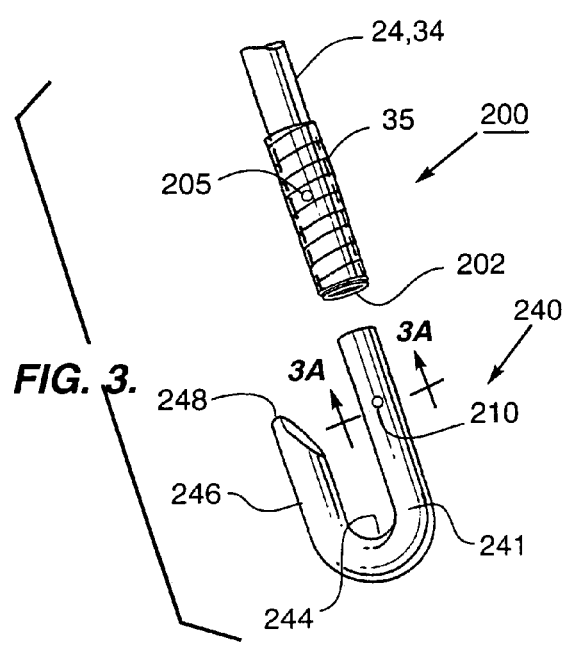
FIG. 3.

LANDSCAPING SHEARS WITH BRANCH TOOL FOR RETRIEVING BRANCHES AND LIMBS

FIELD OF THE INVENTION

The present invention relates to a garden and landscaping tool and more particularly relates to pruning shears, loping shears or trimmers with a branch hook to enable the user to grasp, cut and retrieve branches that would otherwise be out of the reach of the user.

BACKGROUND OF THE INVENTION

Landscapers, professional gardeners and amateur gardeners normally trim trees, shrubs and bushes using hedge shears such as loping or pruning shears. These tools consist of a scissor-like device having a pair of opposed blades attached to handles. Generally loping shears having longer handles and the blades are shorter and are intended for cutting through limbs and branches of thicker diameter. Hedge shears are generally used for light trimming of shrubs and foliage. In many situations, the user will find it necessary to attempt to cut and then retrieve a branch which is out of reach of the user or which is entangled with other branches. This procedure requires the user to extend or stretch to the user's full body extension or to grasp the branch so that it may be trimmed. This can be precarious, particularly if the user is working from a ladder. The user may find it necessary to re-position the ladder and equipment which takes time and effort and in the case of professional arborists and landscapers, increases the costs to the landowner.

An alternative is for the user to dismount the ladder and relocate the ladder to a more convenient location which provides better accessibility. All this takes time and may become a tiring process.

Accordingly, there exists a need for shears, either hedge shears or loping shears, which will provide the user with the ability to grasp and pull branches to within the user's reach so they may be cut and retrieved. The following patents relate to various types of prior art tree trimmers.

U.S. Design Pat. Nos. 305,494 and 347,771 both show pole-mounted pruner hooks.

U.S. Pat. No. 5,634,276 shows a high branch pruning shears having a convex blade, a pull rod and a pull rope. This invention relates to an improved structure for pruning high branches.

BRIEF SUMMARY OF THE INVENTION

Briefly, the present invention provides a cutting tool which enables the user to reach out and engage and grasp branches and limbs which would otherwise be out of the user's reach or entangled or intertwined with other branches. The tool has a cutting head which may comprise either a pair of cutting blades or a cutting blade and a jaw pivotally mounted in relation to one another. An elongated handle is attached to the ends of the pivotal cutting sections. In one embodiment of the invention, one of the handles is provided with a U-shaped end which may be used to retrieve cut branches. The U-shaped end may be integrally formed as part of the handle section or it may be detachably secured to the end of the handle as by a detent. In another embodiment of the invention, the U-shaped branch hook may be detachably clamped along the length of one of the handles to accommodate placement on standard loping or trimming shears. In another embodiment of the present invention, the hook is a somewhat flexible attachment at the end of the handle which, due to its flexibility, can be manipulated through foliage to retrieve cut branches and limbs.

BRIEF DESCRIPTION OF THE DRAWINGS

The above and other objects and advantages of the present invention will become more apparent from the following claims, description and drawings in which:

FIG. 1 is a detail view of the end of the handle of a cutting tool according to the present invention provided with an integrally formed branch hook;

FIG. 2 is a perspective view of a cutting tool according to the present invention provided with a branch hook;

FIG. 3 is a exploded detail view of the end of one handle of the cutting tool according to the present invention provided with a detachable branch hook which may be detached;

FIG. 3A is a sectional view taken along line 3A—3A of FIG. 3;

DETAILED DESCRIPTION OF THE DRAWINGS

Figure 4:
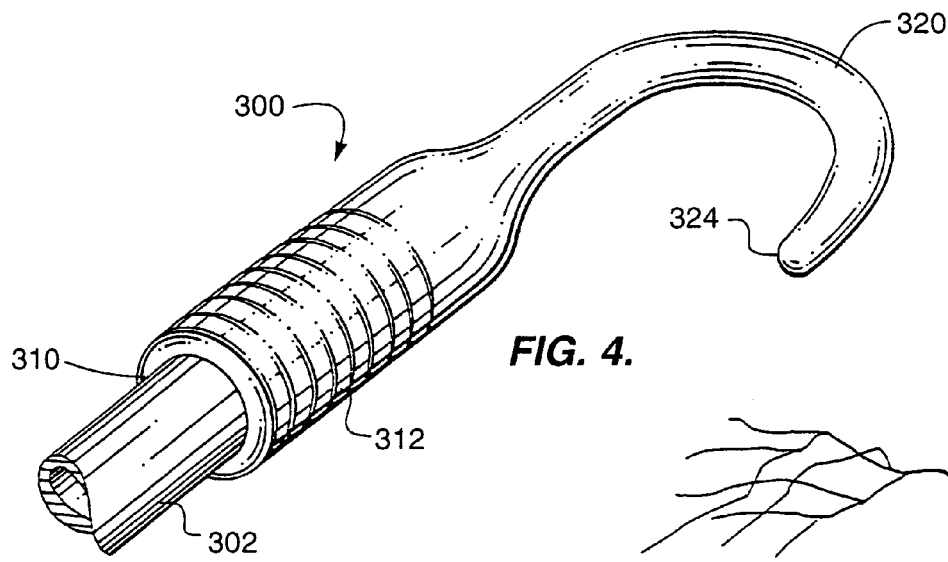
FIG. 4 is a perspective view of the end of a handle of a shears or trimmer with another embodiment of the branch hook.

Turning now to the drawings, in which the same numerals are used to designate the same or similar elements throughout the various view, a preferred embodiment of the tool of the present invention is shown in FIG. 2 and is generally designated by the numeral 10. The tool is a pruning or loping shears for foliage such as shrubbery and branches and includes a first arm member 12 and a second arm member 14 which are connected at pivot 16 by a rivet or a bolt. Arm member 12 includes cutting end 20 which is a blade with a sharpened edge 22. The cutting blade 20 is carried on the end of an elongate handle 24 which may be integrally formed with the blade or may be any material such as wood, plastic or metal handle adjoined to the cutting blade. A handgrip 25 is provided at the lower end of the handle 24 for the comfort of the user.

Arm member 14 has end 30 which provides an anvil surface 30 against which the opposed cutting blade 20 cooperates with sharp edge 32. Arm 14 has an elongate handle section 34 which may be integrally formed with a cutting head or may be a separate section attached to the cutting end. A grip 35 is provided at the lower end of the handle section 34.

It will be appreciated that the style of the cutting tool shown in FIG. 2 is conventional and is generally designated as a loping shears. The tool may also be a trimming or pruning shears for either light or heavy trimming or pruning. The blades 20 and 30 may have various sizes and shapes depending on the intended use.

The present invention relates to an improvement to shears and trimmers of the general type described above. The improvement consists of providing a branch hook which the user may use to reach branches which are normally out of reach of the user. In FIG. 2, the branch hook 40 is as shown as an accessory item which may be retrofit to existing shears and trimmers. The branch hook 40 consists of an elongate body 41 having a U-shape end 42 defining a bight section 44 which is used to engage a tree branch or limb. The hook 40 may be fabricated of any material but is preferably a durable material such as hardened steel. The hook 40 can be attached to either of the handles 24 or 34 of the cutting tool by a clamp 50. The clamp 50 includes a band 52 which extends about the handle and the body 41 of the hook. The clamp may be tightened by means of an adjusting screw 56. The clamp may be of the type similar to the conventional hose clamps commonly used in automotive applications.

The user may retrofit the hook 40 to the handle of the cutting tool at any desired location, preferably closer to the distal end or grip of the handle. The limb hook is secured in place by the clamp. Once in place, a user may engage or hook a tree branch or limb by holding the cutting tool from the handle 24, 25 extending the tool in an open position to effectively double the user's "reach." The convenient hook 42 allows the user to grasp, cut and retrieve branches which would otherwise be out of reach with the user having to dismount and reposition the ladder. The user can grasp the branches, then exert an inwardly pull to bring the branch within reach where it can be grasped by the user's free hand. Once the branch is retrieved, the hook can be disengaged and the branch pulled free.

Turning to FIG. 1, an alternate embodiment of the present invention is shown generally designated by the numeral 100. In this embodiment, one of the handles is, for example handle 34, is provided with a integrally formed branch hook 140. The branch hook again has a U-shaped portion 144 which terminates at an angled end 148 which will assist in guiding the branch into the section 144 of the hook. A grip 35 is provided for the comfort of the user. It is noted that the branch hook 140 is inwardly turned, that is turned and oriented toward the opposite handle, so that it is located where it is less likely to snag or become engaged on a branch or limb during normal cutting operation. When it is desired to grasp a limb or branch, the branch hook of FIG. 1 is used in the manner as described above with reference to FIG. 1.

FIGS. 3 and 3A show yet another embodiment of the present invention designated by the numeral 200. In this embodiment, the handle of shears 24 terminates at a grip 35. The handle has a hollow section 202 at its lower, distal end so that an aperture is defined. A small bore 205 extends through the wall of the handle at a location spaced from end.

The branch hook 240 is shown having section 241 and arm 246 forming a U-shaped section 244. The arm 246 has an angled end section 248. The section 241 has a detent 210 which is shown as a small pin 230 urged outwardly by a spring 232, as seen in FIG. 3A. The diameter of the body of the branch hook is selected so that it can be snugly inserted into the hollow end 202 of the handle. Thus, when the user wishes to use the tree hook, the branch hook 240 can be removed from a storage location such as a tool box or from the user's tool belt and inserted into the end of the handle to grasp, retrieve and cut a branch.

In the embodiment of FIG. 3, the tree hook can be inserted with the U-shaped portion extending in a direction either inwardly from the handle or outwardly.

The tapered ends of the hooks shown in all of the embodiments provides a means to guide to a limb or branch into the U-shaped bight section during the cutting and retrieval procedure.

In FIG. 4, another embodiment of the branch hook designated by the numeral 300 is shown. The handle 302 of a tool, such as a shears or trimmer 350, is provided with the hook which is a material such as rubber or plastic having suitable strength and wear characteristics and some flexibility. The hook 300 defines a bore 310 which receives the handle. The hook may also have a grip section 312. A hook end 320 is integrally formed ans is U-shaped terminating at rounded end 324.

Figure 5:
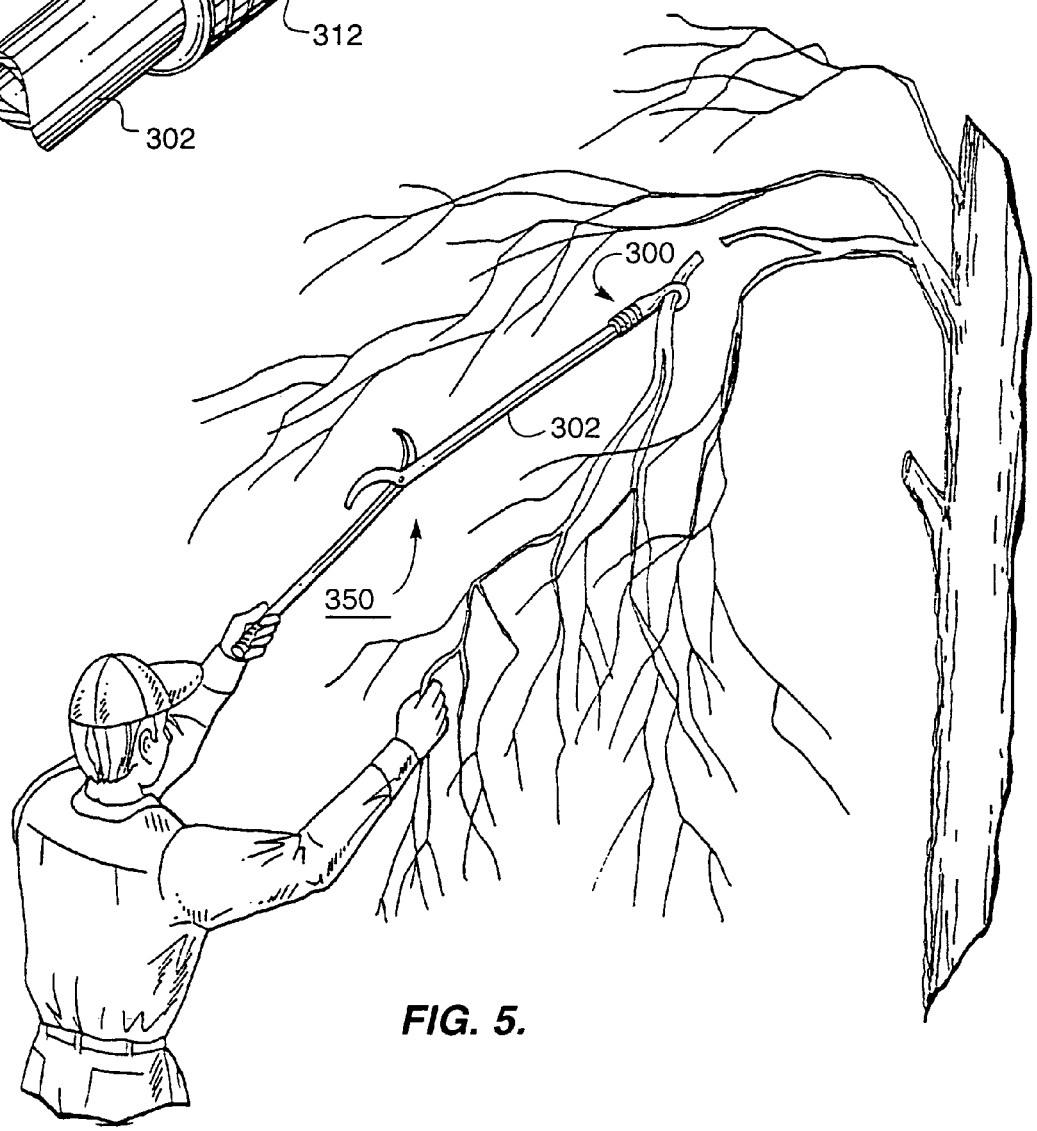
FIG. 5 shows the hook of FIG. 4 being used to retrieve an entangled branch.

In FIG. 5, the branch hook 300 is shown retrieving a cut or severed branch "B" bringing it into reach of the free left hand of the user. The flexibility of the U-shaped hook end 320 facilitates use and allows the user to better insert, guide and manipulate the hook end through entangled branches and foliage. This allows the user to twist the hook end to retrieve branches. Due to the flexibility of the hook, the user can thread the handle and branch hook through foliage and extricate the severed branch by twisting and pulling as necessary to avoid entanglement.

Accordingly, the present invention provides a highly useful and utilitarian branch hook which can be incorporated as a component of loping, pruning or other shears as an item of original manufacture or can be provided as an aftermarket retrofit item which can be attached to existing shears and trimmers.

It will be obvious to those skilled in the art to make various changes, alterations and modifications to the invention described herein. To the extent these various changes, alterations and modifications do not depart from the spirit and scope of the appended claims, they are intended to be encompassed therein.

I claim:

1. A landscaping tool of the type having a pair of handles each having a cutting end and in pivotal relationship, the improvement comprising:
    (a) a generally U-shaped branch hook associated with one of the handles whereby the user may open the handles and hold the other handle using the hook to grasp branches and limbs that would otherwise be out of reach; and
    (b) said branch hook being a flexible elastomeric material to enable the branch hook to be manipulated through entangled foliage.

2. The landscaping tool of claim 1 wherein the tool is a loping shears.

3. The landscaping tool of claim 1 wherein the tool is a pruning shears.

4. The landscaping tool of claim 1 wherein the said branch hook is detachably secured one of said handles.

5. The landscaping tool of claim 1 wherein the hook is formed as a part of the end of the handle opposite the cutting end.

6. The landscaping tool of claim 4 wherein said hook is secured to one of said handles by a detent.

7. The landscaping tool of claim 4 wherein said hook is secured to one of said handles by a clamp.

8. The landscaping tool of claim 1 wherein the said branch hook has a integrally formed body which has a bore to receive the end of one handle.

9. A landscaping tool comprising:
    (a) first and second blades pivotally connected, at least one blade having a cutting edge;
    (b) first and second handles having a proximal end affixed to said respective first and second blades for manual actuation of said blade between and open position and a closed cutting position, said handles having a distal end opposite said proximal end; and (c) a branch hook having a body and a generally U-shaped end, said body defining a bore receiving the distal end of said first handle, said U-shaped end being a flexible elastomeric material whereby the user may fully open the tool grasping the second handle and engage foliage with the branch hook on the first handle to enable the user to access foliage that otherwise would be out of reach.

10. The tool of claim 9 wherein said flexible branch hook is rubber.

11. The tool of claim 9 wherein said flexible branch hook is plastic.

12. The tool of claim 9 wherein said first and second blades are loping blades.

* * * * *